United States Patent Office.

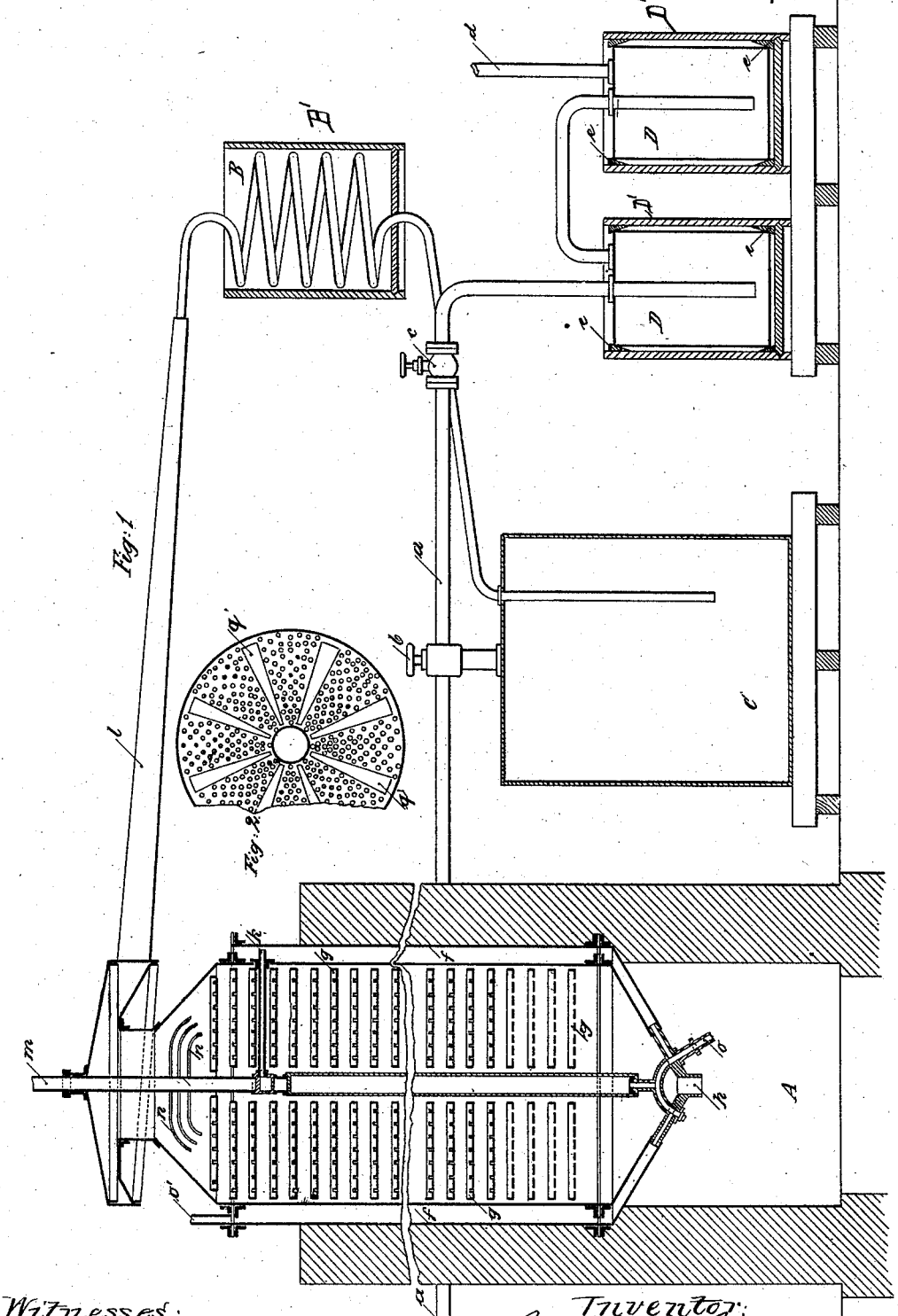

BERNHARD BOROWSKY, OF STARGARD, PRUSSIA, GERMANY.

APPARATUS FOR MANUFACTURING VARNISH.

SPECIFICATION forming part of Letters Patent No. 286,528, dated October 9, 1883.

Application filed July 31, 1882. (No model.)

*To all whom it may concern:*

Be it known that I, BERNHARD BOROWSKY, of Stargard, in the Kingdom of Prussia and German Empire, have invented a certain new and Improved Process of and Apparatus for the Manufacture of Perfectly Light and Pure Amber Varnish; and I do hereby declare the following to be a full, clear, and exact description of the same, reference being had to the accompanying drawings, forming a part of this specification, and to the figures and letters of reference marked thereon.

Amber is very much required for the manufacture of varnish for its superior qualities; but it is supplanted by the more expensive copal, for the reason that the latter can be manufactured perfectly light, clear, and transparent, while it is impossible by any known process to produce amber varnish of the same degree of transparency. In melting amber for the manufacture of varnish, small particles of coal are formed which cannot readily be separated from the resulting product. By means of my improved process and apparatus, however, I am enabled to produce a perfectly light and clear solution of amber of any consistence.

The invention consists, first, in diluting the molten amber by means of turpentine or other equivalent, for the purpose of allowing the impurities in the solution to settle in a very much shorter space of time; or, as a quicker method, the solution may be filtered by any suitable means, then the diluting material, preferably turpentine, is removed by distillation, and its heavy vapor carried off by a strong draft of air.

In the accompanying drawings, Figure 1 is a sectional view of the apparatus employed in carrying out my invention; Fig. 2, a top plan view of one of the trays used in the distilling apparatus.

A represents the still for separating the diluted amber from the diluting-liquid; and it consists of a cylindrical chamber having double walls, between which the steam for heating it circulates. The steam enters said steam-space at $o$ and escapes at $o'$, after circulating around the inner chamber and passing through the large pipe, passing up the center of said chamber, which pipe is also connected with the steam-space near its top by means of the small pipe $k$. At the upper end of this large pipe is attached a small pipe, $m$, which does not communicate with the large pipe, but is simply connected therewith, through which the diluted liquid amber is introduced into the receptacle. Encircling and supported in any suitable manner upon said large pipe are a series of circular trays, $g$. These trays are perforated and are provided with radial slots $g'$, as shown in Fig. 2, for the passage of air up through them, and have an upturned rim, both around their inner and outer circumference and around the slots $g'$, and the perforations in said trays are provided with small tubes that extend nearly but not quite to the level of the rim of said tray. The trays near the bottom of the chamber are not provided with these small tubes in the perforations, but have the rims. The opening $h$ in the bottom of the inner chamber of the still is for the admission of air to the interior, and also for the exit of the thickened and purified amber. The pipe $l$ connects the top of the still with the worm B, located in the cooling-receptacle B', which contains cold water. This pipe, after leaving the worm, extends down to the receptacle C, for containing the distilled turpentine. The pipe $a$ is provided with a strong blast of air, produced by a suction-fan, injector, or any suitable means, in the direction of the arrow in Fig. 1, and has in it two valves, $b$ and $c$, one, $b$, controlling admission to the receptacle C, and the other, $c$, to the receptacles D D, which will be more fully described hereinafter. The pipe $d$, which enters one of the receptacles D, extends to the furnace, where the amber is melted, and at the proper time, and by reason of the suction in said pipe $a$, draws in and conducts the vapor from the melting amber into the receptacle D, where it is condensed by coming in contact with the cool sides of the vessels, and the oil condensed is adapted to be drawn off by faucets as often as necessary. These receptacles D D are set in larger receptacles D', and are held in place by means of keys $e\ e\ e$, and adapted to be cooled by water contained in the outer receptacle.

The operation of my improved process is as follows: The amber is melted in a suitable furnice and the melted amber, diluted by means of turpentine or other suitable solvent, is allowed to settle for three or four weeks, at the end of which time it is perfectly clear and pure; or it may be filtered, and in this manner much time is saved. While the amber is being melted, the valve $b$ in pipe $a$ is closed and valve $c$ opened and the suction-fan started. The vapor from the melting amber is drawn into pipe $d$, which, as before stated, extends under the hood of the melting-furnace, by reason of the suction in said pipe, and is condensed in chambers D D in the form of amber-oil, which may be drawn off by faucets, &c. When the melting operation is finished, the valve $c$ is closed and $b$ opened, the steam is admitted to the steam-space between the cylinders of the distilling apparatus, and the diluted amber poured in the pipe $m$, and through the small branch pipes $n$ $n$ onto the top tray of the series in the cylinder. The liquid amber and turpentine dropping from tray to tray in the cylinder through the perforations in them, and by the combined action of the suction, and heat becomes thick, and the turpentine which is contained in the solution evaporates and is drawn by the suction into the pipe $l$ and into the worm B, where it is condensed and runs into the receptacle C, provided for containing it, from whence it may be removed when convenient. The heavier vapor which does not condense in the worm is drawn off by the suction in pipe $a$. The amber, when freed from the turpentine or other diluting material, drops from tray to tray until it runs out at $h$ very thick, and it may be collected in suitable vessels. When it is to be used for varnish, it is diluted with turpentine again, and a very pure and clear varnish is thus obtained.

I claim as my invention—

1. The herein-described process of purifying amber for varnish, consisting in melting the amber, diluting it with turpentine or its equivalent, allowing the solution to settle, and then introducing it into a steam-heated receptacle onto a series of perforated trays, from one to the other of which it drops, drawing off the vapor of the turpentine or other solvent by means of a strong draft of air into a condenser, where the lighter vapor condenses, and carrying off the heavier vapors by means of said blast, substantially as described.

2. In an apparatus for purifying amber for varnish, the combination, with the steam-jacketed inner cylinder having the pipe extending up through its center and supporting the series of trays, each provided with perforations through which the amber solution percolates, said cylinder having inlet and outlet openings for the passage of air-currents through it, of a distilling apparatus, substantially as described, and a reservoir for receiving the condensed solvent, through which a current of air is passed to carry off the heavier vapors, as set forth.

3. The circular trays having the upturned rims, the upwardly-projecting small tubes for the passage of the amber solution, and the radial slots for the upward passage of the air, having the upturned rims, substantially as described.

In testimony whereof I have signed my name to this specification in the presence of two subscribing witnesses.

BERNHARD BOROWSKY.

Witnesses:
H. ZIMMERMAN,
G. DITTMAR.